(12) United States Patent
Bridgen et al.

(10) Patent No.: US 9,594,772 B2
(45) Date of Patent: Mar. 14, 2017

(54) MULTI-MODAL JOURNEY PLANNER

(75) Inventors: Anna Bridgen, Basingstoke (GB);
Andrew Flatt, Four Marks (GB);
Jonathan C. Mace, Providence, RI
(US); Richard W. Pilot, Southampton
(GB)

(73) Assignee: International Business Machines Corporation, Armonk, NY (US)

( * ) Notice: Subject to any disclaimer, the term of this patent is extended or adjusted under 35 U.S.C. 154(b) by 389 days.

(21) Appl. No.: 14/234,999

(22) PCT Filed: Jul. 25, 2012
(Under 37 CFR 1.47)

(86) PCT No.: PCT/IB2012/053772
§ 371 (c)(1),
(2), (4) Date: Jan. 24, 2014

(87) PCT Pub. No.: WO2013/014612
PCT Pub. Date: Jan. 31, 2013

(65) Prior Publication Data
US 2014/0188788 A1     Jul. 3, 2014

(30) Foreign Application Priority Data
Jul. 27, 2011   (EP) ................................... 11175632

(51) Int. Cl.
*G06F 17/30*     (2006.01)
*G01C 21/34*     (2006.01)
(52) U.S. Cl.
CPC ... *G06F 17/30241* (2013.01); *G01C 21/3423* (2013.01)

(58) Field of Classification Search
CPC ............ G01C 21/3423; G01C 21/3415; G06F 17/30241
See application file for complete search history.

(56) References Cited

U.S. PATENT DOCUMENTS

| 7,756,615 | B2 | 7/2010 | Barfoot et al. |
| 7,831,433 | B1 | 11/2010 | Belvin et al. |

(Continued)

FOREIGN PATENT DOCUMENTS

| CN | 101776455 | 7/2010 |
| EP | 1939802 A2 | 7/2008 |

OTHER PUBLICATIONS

P. Andre et al., "Journey Planning Based on User Needs", ACM, CHI 2007, Student Design Competition, 2007, San Jose, CA, pp. 2025-2030.

(Continued)

*Primary Examiner* — Robert Beausoliel, Jr.
*Assistant Examiner* — Hau H Hoang
(74) *Attorney, Agent, or Firm* — Law Office of Jim Boice

(57) ABSTRACT

A method, system, computer program product and computer program for generating a multi-modal journey itinerary comprising: receiving, from a user, a desired destination; determining the user's current location; determining the user's current mode of transport; accessing a multi-modal route graph; determining, in response to determining the user's current location and of determining the user's current mode of transport, a user's position in the multi-modal route graph; and calculating, in response to determining the user's position in the multi-modal route graph, a multi-modal journey itinerary from the user's position in the multi-modal route graph to the desired destination.

16 Claims, 7 Drawing Sheets

(56) References Cited

U.S. PATENT DOCUMENTS

| | | |
|---|---|---|
| 7,835,859 B2 | 11/2010 | Bill |
| 7,844,394 B2 | 11/2010 | Kim |
| 2005/0004757 A1 | 1/2005 | Neeman et al. |
| 2006/0206258 A1 | 9/2006 | Brooks |
| 2010/0103040 A1 | 4/2010 | Broadbent |
| 2010/0197325 A1* | 8/2010 | Dredge ................... H04L 67/18 455/456.3 |
| 2010/0228476 A1 | 9/2010 | Bar-Zeev et al. |
| 2010/0228574 A1* | 9/2010 | Mundinger .......... G06Q 10/047 705/4 |
| 2010/0280748 A1 | 11/2010 | Mundinger et al. |
| 2011/0034147 A1* | 2/2011 | Issa ................... H04M 1/72572 455/410 |
| 2011/0172909 A1* | 7/2011 | Kahn ................... G01C 21/165 701/533 |
| 2011/0289031 A1* | 11/2011 | Zheng ................... G01C 21/20 706/14 |

OTHER PUBLICATIONS

P. Modlitba, "Going My Way: A User-Aware Route Planner", MIT Media Lab, Jan. 8, 2008, Abstract Only.

J. Booth et al., "A Data Model for Trip Planning in Multimodal Transporation Systems", ACM, EDBT 2009, 2009, pp. 1-12.

International Searching Authority, International Search Report and Written Opinion for International Application No. PCT/IB20121053772, Mailed Dec. 20, 2012.

Anonymous, "Barclays Cycle Hire", Retrieved Nov. 15, 2013, Via web.archive.org, pp. 1-3.

Anonymous, "Visitor Tickets", Retrieved Nov. 15, 2013, Via web.archive.org, pp. 1-3.

Anonymous, "Intermodal Journey Planner", wikipedia.org, Retrieved Jan. 24, 2014, Last Modified Dec. 12, 2013, pp. 1-6.

Anonymous, "Journey Planner", wikipedia.org, Retrieved Jan. 24, 2014, Last Modified Jun. 4, 2013, pp. 1-4.

* cited by examiner

MULTI-MODAL JOURNEY PLANNER

BACKGROUND

This invention relates to a method, system, computer program product and computer program for generating a multi-modal journey itinerary. In one embodiment of the invention, the method and system provide transportation detection for multi-modal journey planners.

A journey planner is a specialized search engine used to find the best (shortest or quickest) journey between two points. Journey planners have been used in the travel industry since the 1970s accessed by booking agents through a user interface on a computer terminal, and also to support call centre workers providing public transport information. With the advent of the Internet, online journey planner interfaces for use by the general public have become widely available. There are two prominent types of journey planners currently in existence. The first type is a single transport route planner, which plan directions within a single closed system. An example of this would be an in-car global positioning system (GPS) navigator.

The second type is an intermodal (also called multi-modal) journey planner. Such a journey planner can provide a traveller with an itinerary for an intermodal passenger transport journey, using different modes of transport. The planner can provide timetable, routing and other travel information during which a single journey may use a sequence of several different modes of transport, meaning that the planner must know about public transport services such as bus and train routes and about generalized transportation networks such as roads, footpaths and cycle routes that are used for private transportation.

Much like in-car GPS systems which rose to prominence in the early 2000's, now that a large number of individuals are starting to carry smart phones around with them, multi-modal planners will become more commonplace. For example, Transport For London has an online site where a user can get travel directions across London which uses a variety of modes of transportation. Intermodal journey planners differ from single-transport route planners, because they are essentially an aggregation of multiple single-transport route planners. This introduces a number of complexities.

For example, the TFL solution is a static implementation that a user can access online, and has some limitations and assumptions. Firstly, the planner assumes that the user is starting a new journey, i.e. that they are not mid-journey, and that they are capable of getting from their current location to the start of the directions somehow (for example by walking) Secondly, the planner assumes that the user remains on the directions. There is no detection to see whether the user strays from their path. These assumptions are common to existing intermodal journey planners. The knock-on effect of these assumptions is that intermodal planners cannot be used on-the-fly in the way that single-transport planners can be used.

Therefore, there is a need in the art to address the aforementioned problems.

SUMMARY

A method, system, computer program product and computer program for generating a multi-modal journey itinerary comprising: receiving, from a user, a desired destination; determining the user's current location; determining the user's current mode of transport; accessing a multi-modal route graph; determining, in response to determining the user's current location and of determining the user's current mode of transport, a user's position in the multi-modal route graph; and calculating, in response to determining the user's position in the multi-modal route graph, a multi-modal journey itinerary from the user's position in the multi-modal route graph to the desired destination.

BRIEF DESCRIPTION OF THE SEVERAL VIEWS OF THE DRAWINGS

The present invention will now be described, by way of example only, with reference to preferred embodiments, as illustrated in the following figures.

DETAILED DESCRIPTION

Figure 1:
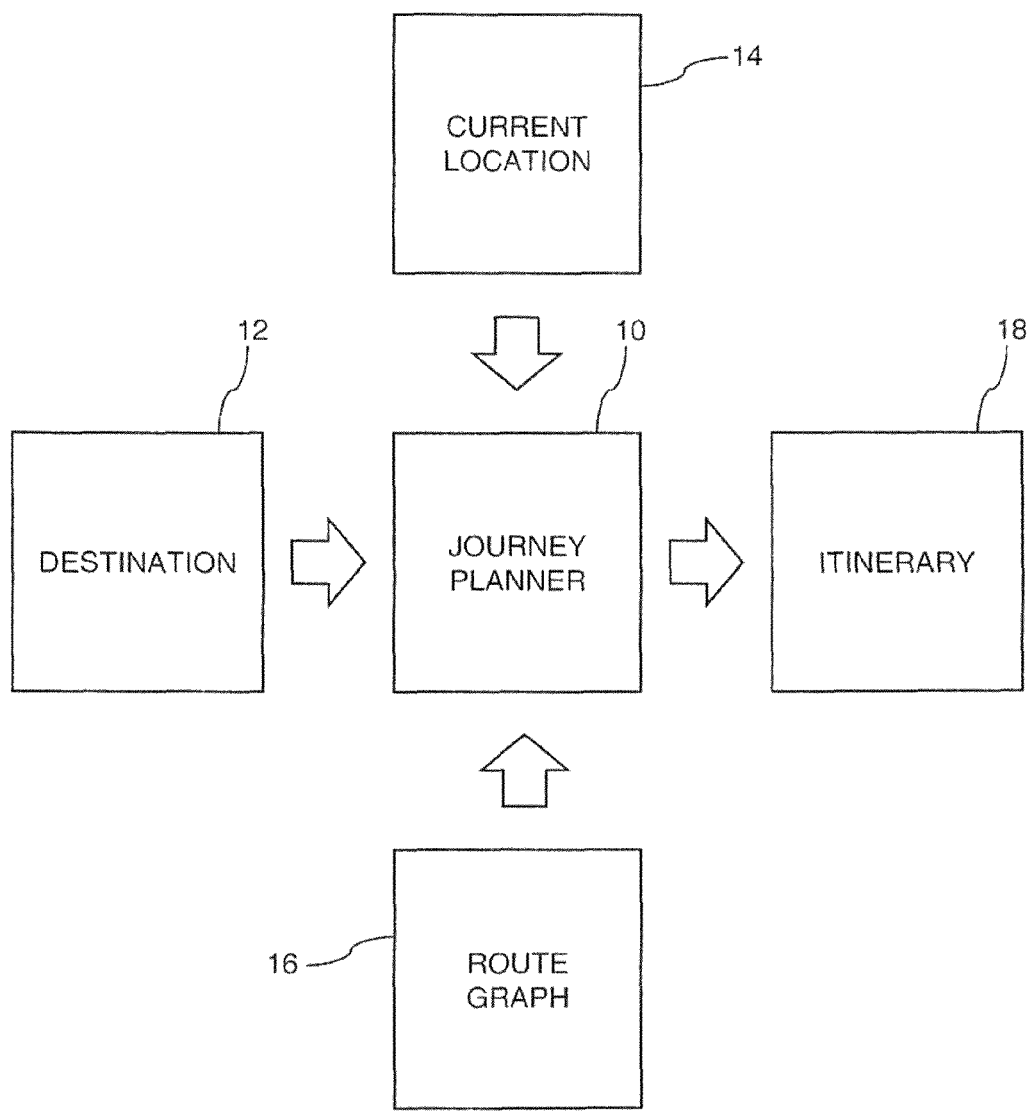
FIG. 1 is a schematic diagram of the inputs and output of a journey planner, in accordance with the prior art, and in which a preferred embodiment of the present invention may be implemented.

FIG. 1 illustrates the basic principle of a journey planner 10, showing the inputs to the journey planner 10 and the output of the journey planner 10. The journey planner 10 receives details of a destination 12 from a user. The journey planner 10 also has knowledge of the current physical location 14 of the user and accesses a route graph 16 in order to produce an itinerary 18. The destination 12 and current physical location 14 can be expressed in any form that is acceptable to the journey planner 10. For example, names of locations or street names can be used and/or postal (zip) codes can be used as can more precise location information such as GPS co-ordinates or map co-ordinates.

The journey planner 10 shown in FIG. 1 applies to existing journey planners 10 such as an in-vehicle GPS device known as a "satnav". The user in their car will input a destination either using a text input of a location name or postal (zip) code or will find a location on a navigable map displayed by the device. The GPS device will then access the route graph 16 and use a predefined algorithm to generate the itinerary 18. The itinerary 18 is usually expressed as a series of instructions that the user will follow while they are driving their vehicle as well as providing on-screen information to the user as they are driving.

The route graph 16 is essentially a mathematical graph of nodes and edges. In the graph 16, a node represents a location in the real world, and the edges represent state changes between nodes according to the existence of navigable roads in the real world. The edges are weighted with a distance and/or with a time taken to travel between the two nodes linked by an edge. The itinerary 18 can be constructed, for example, on the basis of either the quickest route between two points or the shortest route between two points. The journey planner 10 can also detect whether the user has deviated from the itinerary 18 and can recalculate the itinerary 18 accordingly, thereby providing live route planning The improved system provided by the present invention allows live route planning into the multi-modal journey planner 10, by solving a number of the inadequacies in current implementations of such journey planners 10. Current implementations of live route planning of a single-transport journey planner 10 will have a stage in the route determining where new data is received indicating a change in the user's location. After the new co-ordinates are received, the journey planner 10 will update the user's position on its internal graph, based on the new co-ordinates received. Then the journey planner 10 will then update the route information displayed to the user via the user interface of the journey planner 10.

In the multi-modal case, the journey planner 10 may indeed receive new location data to update the user's physical location, but depending on the user's physical location, they could actually be in a number of different positions (for example, in a car, on a bus, on a train or on foot). Instructions that apply to certain transportation modes do not apply to others, for example, an instruction to a user to take the next left turn will be impossible if the user is riding a bus. As such, the update position function becomes problematic for multi-modal journey planners 10. A single physical location in the real world potentially corresponds to a number of positions on the internal graph representation 16 of the journey planner 10.

Figure 2:
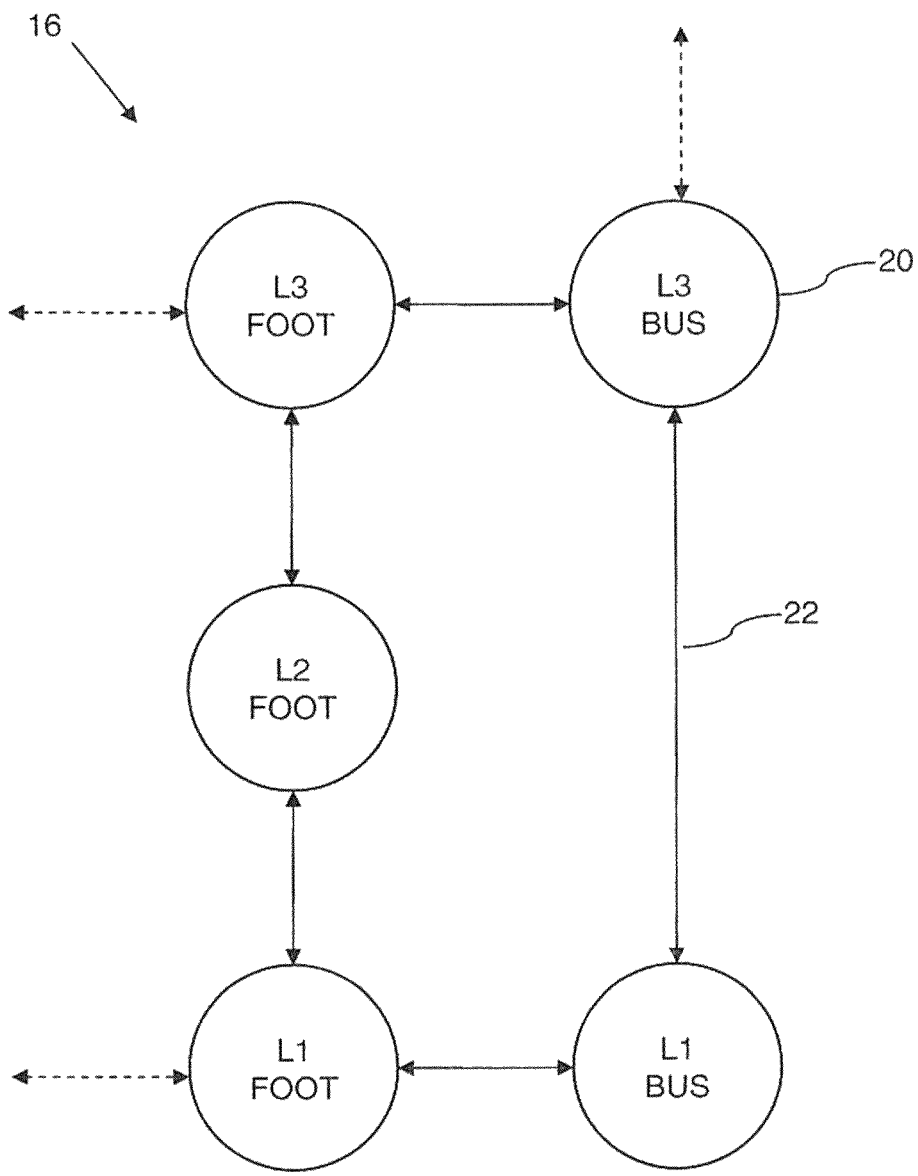
FIG. 2 is a diagram of a route graph of nodes and edges, in accordance with a preferred embodiment of the present invention.

For a multi-modal journey planner 10, a position on the internal graph representation 16 has a mode of transportation associated with the node 20. FIG. 2 illustrates a portion of such a route graph 16, with nodes 20 and edges 22. Each node 20 has a location name L1, L2 etc. and also a mode of transport associated with the specific position, in this example being on foot or on a bus. The improved journey planner 10, providing a multi-modal planning system, comprises a position determiner component 24, a node selector component 26, and a user profiler component 28. The position determiner component 24 determines which graph node 20 corresponds to the user's physical location. The position determiner component 24 also uses available feeds to work out the most probable mode of transport the user is using, as well as the most probable position the user is using in the corresponding transportation system.

Figure 3:
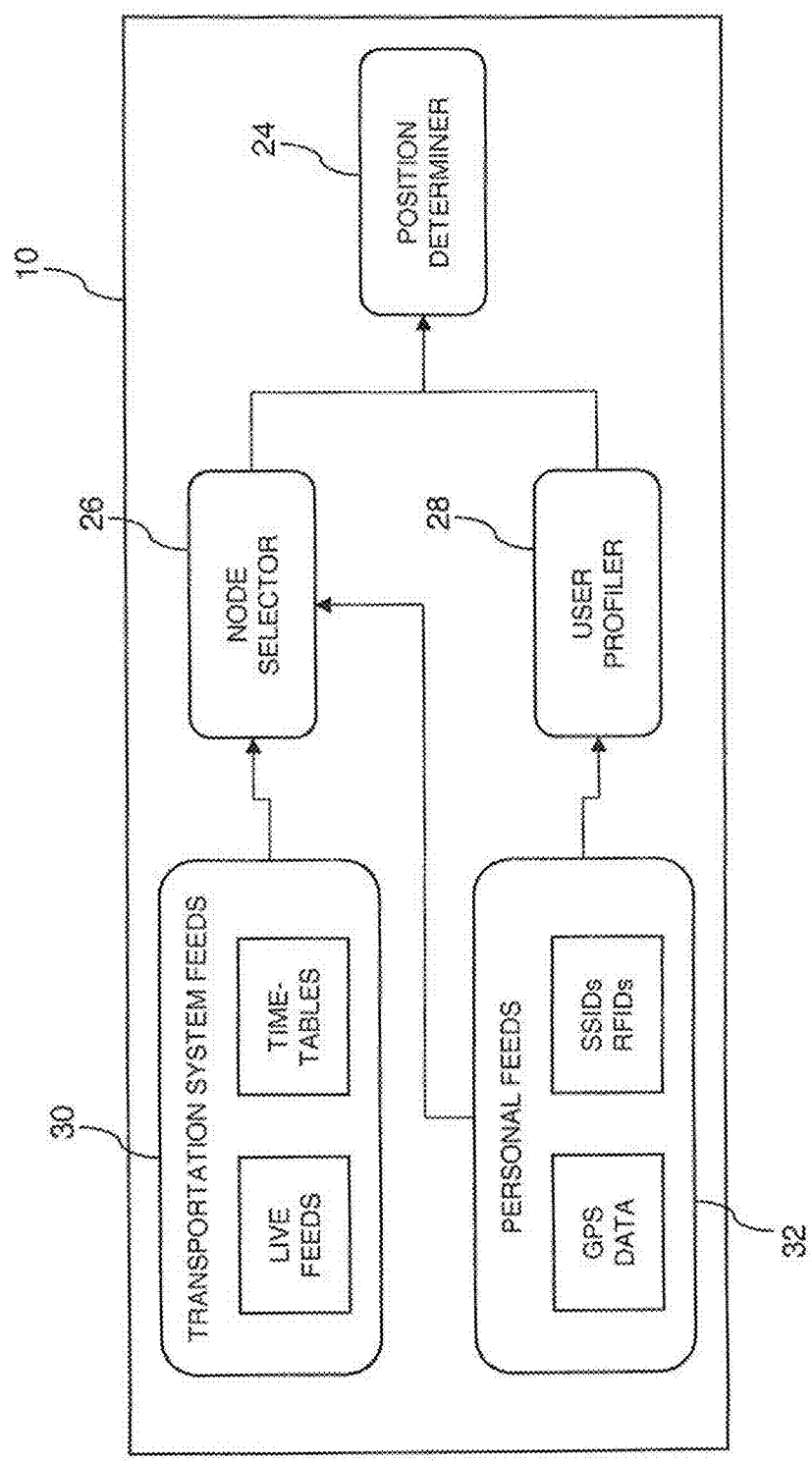
FIG. 3 is a schematic diagram of a journey planner, in accordance with a preferred embodiment of the present invention.
Figure 4:
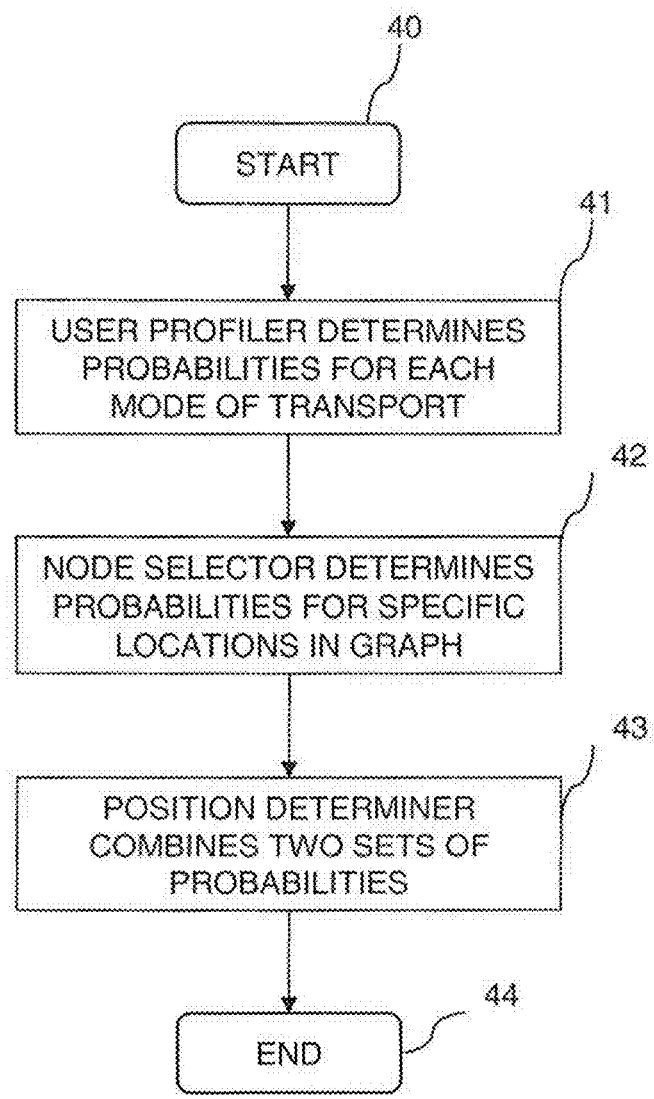
FIG. 4 is a flowchart of part of the operation of the journey planner, in accordance with a preferred embodiment of the present invention.

FIG. 3 shows more detail of the journey planner 10 according to a preferred embodiment of the invention. A position determiner component 24 receives information from a node selector component 26 and a user profiler component 28. The node selector component 26 receives information from transportation system feeds 30 and personal feeds 32; and the user profiler component 28 receives information from the personal feeds 32. The position determiner component 24 performs a three step process 41, 42, 43, illustrated in FIG. 4, in the operation of placing the user on the multi-modal route graph 16. The inputs to the position determiner component 24 are a variety of sources of information, including live data such as GPS data. As an output, the position determiner component 24 produces a list of internal graph nodes. For each graph node in the output, there is also a probability. The probability for a graph node corresponds to the likelihood that the user is at that graph node in terms of their current location and the current mode of transport that is being used.

Following the start of the process 40, in the first step 41 of the process, the user profiler component 28 receives as input a number of live data feeds 32. These feeds 32 are called personal feeds 32 because they are data collected by sensors on the user's device, and are specific to the user. For example, they can consist of GPS data, Wifi service set identifiers (SSIDs), nearby radio frequency identification (RFID) tags, accelerometer data and any other location-detecting services that can be accessed by the user's device. In relation to the user, each known mode of transport is considered. For each mode of transport, the data from the personal feeds 32 is compared to expected values for that mode of transport and from this a probability is calculated. The probability corresponds to the likelihood that the user is on the given mode of transport.

Examples of expected values use, for example, information such as: buses are expected to be travelling on average 30-60 miles per hour (mph); coaches have on-board Wifi so the presence of particular Wifi SSIDs indicate a coach; and accelerometers behave like a pedometer when the user is walking This first step 41 also considers the user's personal navigation history. For example, if the user catches the bus at the same time every day, then this can be used to increase the likelihood of the user being on a bus. An example output for step 1 is the following Table 1 (with probabilities totalling 1):

TABLE 1

| Transportation mode | Probability |
| --- | --- |
| Underground railway | 0.40 |
| Bus | 0.35 |
| Walking | 0.20 |
| Car | 0.05 |
| Train | 0.00 |

In the second step 42 of the process, the node selector component 26 also receives as input a number of live data feeds 30. These feeds 30 are called transportation system feeds, because they are general data either stored on the user's device or received across a network. For example, they refer to feeds such as live location data for public transport, stored timetables for public transport and known road-blocks, traffic delays, cancelled routes, etc. The node selector component 26 also receives certain location data feeds, such as GPS data, from the personal feeds 32.

As described above, internal graph representations for transportation systems can contain multiple internal graph nodes 20 which correspond to a single physical real-world location. The node selector component 26 considers in turn each individual transportation system. The node selector component 26 considers the transportation system feeds 30 and the user's personal feeds 32, and calculates a probability for each internal graph node 20. This probability corresponds to the probability that the user's current location and situation is represented by that internal graph node. An example output for step 2 of the process is the following table 2 (with probabilities totalling 1 for each individual transportation mode):

TABLE 2

| Transportation mode | Internal Graph Node | Probability |
| --- | --- | --- |
| Underground railway | Oxford Circus, Central line | 0.40 |

TABLE 2-continued

| Transportation mode | Internal Graph Node | Probability |
| --- | --- | --- |
| Underground railway | Oxford Circus, Victoria line | 0.30 |
| Underground railway | Oxford Circus, Bakerloo line | 0.30 |
| Bus | Oxford Circus Bus Stop, 9:45 Bus 7 | 0.50 |
| Bus | Oxford Circus Bus Stop, 9:45 Bus 5 | 0.40 |
| Bus | Oxford Circus Bus Stop, 9:40 Bus 4 | 0.10 |
| Walking | Oxford Street | 0.60 |
| Walking | Regent Street | 0.35 |
| Walking | Princes Street | 0.05 |
| Car | Oxford Street | 0.80 |
| Car | Princes Street | 0.20 |
| Train | Charing Cross | 0.60 |
| Train | Victoria | 0.40 |

In a preferred embodiment, at the third step 43, the position determiner component 24 takes the probabilities output from the first step 41 and multiplies them as appropriate by the output from the second step 43. This gives a single list of probabilities, ordered as per the following example table 3:

TABLE 3

| Transportation mode | Internal Graph Node | Probability |
| --- | --- | --- |
| Bus | Oxford Circus Bus Stop, 9:45 Bus 7 | 0.175 |
| Underground railway | Oxford Circus, Central line | 0.160 |
| Bus | Oxford Circus Bus Stop, 9:45 Bus 5 | 0.140 |
| Underground railway | Oxford Circus, Victoria line | 0.120 |
| Underground railway | Oxford Circus, Bakerloo line | 0.120 |
| Walking | Oxford Street | 0.120 |
| Walking | Regent Street | 0.070 |
| Car | Oxford Street | 0.040 |
| Bus | Oxford Circus Bus Stop, 9:40 Bus 4 | 0.035 |
| Walking | Princes Street | 0.010 |
| Car | Princes Street | 0.010 |
| Train | Charing Cross | 0.000 |
| Train | Victoria | 0.000 |

At this point, the position determiner component 24 has produced a list of internal graph nodes 20 that is ordered by the most likely for the user's current node location 20. The journey planner 10 accesses the list produced by the third step 43 and from this list the internal graph node 20 with the highest probability is selected. The journey planner 10 now assumes that the user is at the node position 20 selected. If the user is mid-journey and therefore has an existing set of instructions, the instructions are inspected. If the list of instructions includes the node 20 that the user is now at, it is assumed that the user has therefore progressed normally to this point. If the list of instructions does not include the node 20 that the user is now at, it is assumed that the user has deviated off course.

Finally, new instructions are calculated, using the node 20 that the user is now at as the start node 20 for the journey planning Since live feeds and information is available to the journey planner 10, the journey planner 10 can incorporate these feeds into its planning to provide more accurate instructions to the user. Additionally, in its original instructions, the journey planner 10 may have expected the user to adhere to certain timings. By comparing the user's now-calculated location with the user's expected location according to the previous plan, the journey planner 10 can determine if and how far the user is ahead or behind schedule. This can also be used as a factor to further planning In the example above, probabilities were used which sum to 1. There is no reason for the output of each step to be this way; general weightings can be used instead of probabilities if desired.

This part of the process ends at the end stage 44.

In an alternative embodiment, at the third step 43, the results from the first step 41 and the second step 42 are combined using different algorithms, for example, by using weighting factors.

Figure 5:
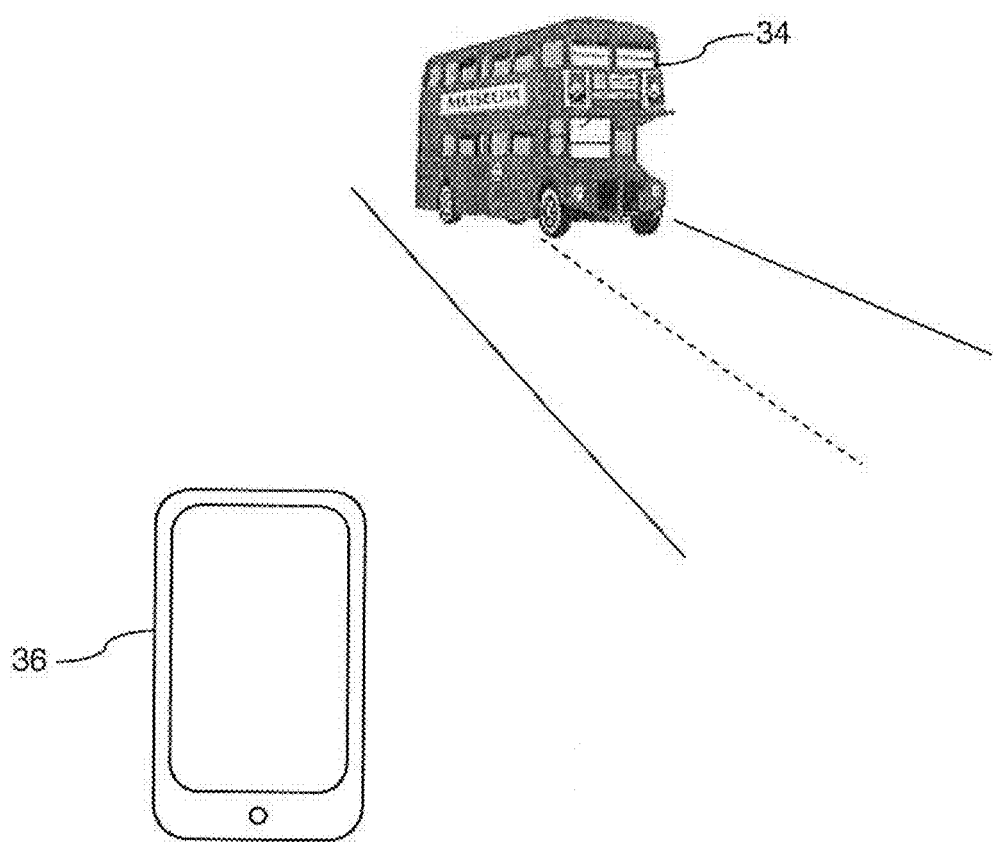
FIG. 5 is a schematic diagram of a bus and a smart phone, in accordance with a preferred embodiment of the present invention.

FIG. 5 illustrates an example of initial position determination. In this example the initial determination is based on live feeds. The user is on a bus 34 and turns on their routing system. A smart phone 36 which the user has with them has a processor that is running the journey planner 10 (as a self-contained application) and operates all of the steps in the algorithm illustrated schematically in FIGS. 3 and 4. The smart phone 36 knows that the user is travelling at vehicle speed on a road. The journey planner 10 looks up live feeds for transportation in this area and finds that there is a bus in the user's vicinity. The journey planner 10 therefore determines that the user is on a bus. The smart phone 36 is able to access up-to-date information about the movement and location of transport units such as the bus 34 and this is available to the journey planner 10.

In another example the initial determination can be based on a GPS profile. The user is on a bus and turns on their routing system. The smart phone 36 determines that that the user is travelling at vehicle speed on a road. The journey planner 10 cannot determine if the user is in a car or on a bus, so defaults to car. The smart phone 36 has access to bus timetable information for this area and knowledge of bus stops in the area. The bus stops at a bus stop. The user's movement indicates to the journey planner 10 what has happened. The system increases the likelihood that the user is on a bus and changes its directions accordingly.

As discussed above, the journey planner 10 can also update directions based on position determination, for example by choosing from multiple choices for the same transportation type. For example, the user may be at a tube station that has two different tube lines and therefore two different platforms. The user's current directions are to go to line B. However, the node selector component 26 in the system determines that the user is in the tube station. The user is erroneously waiting on platform for line A. The smart phone 36 picks up nearby SSIDs that the phone 36 knows are for line A. In response, the journey planner 10 gives walking directions to the user to line B.

In a preferred embodiment, recalculation can also be based on live feeds. In another example, the user is on a bus. The journey planner 10 determines that the user is on the bus. The bus stops at a bus stop and the user gets off. However, the journey planner 10 has live feeds of the bus's position and as the bus pulls away from the bus stop, the journey planner 10 determines that the user's position is getting distant from the bus's position. Therefore it can be determined that the user is no longer on the bus. The most likely mode of transport is now on foot. Directions are updated accordingly.

The user is provided with the possibility of overriding a choice. For example, the user is beginning their journey, and is currently standing outside a building. They turn on their routing system. The journey planner 10 determines that the user's current mode of transportation is a car. However, the user is not in a car and wishes to change their current mode of transport to being on foot. The system presents the user with a list of alternative modes of transportation. Since on foot is the second most likely mode, it is the first presented to the user. The user selects on foot. The itinerary 18 is recalculated based on this choice.

Figure 6:
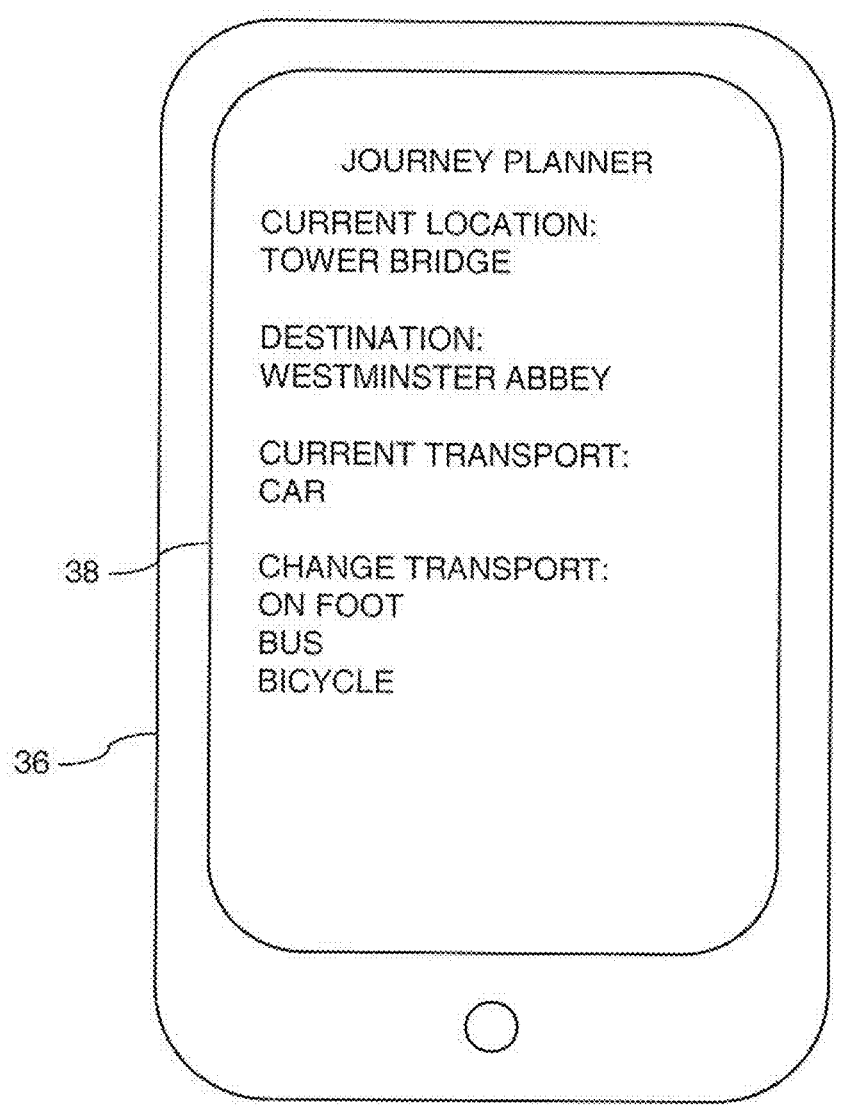
FIG. 6 is a more detailed schematic diagram of the smart phone, in accordance with a preferred embodiment of the present invention.

FIG. 6 illustrates the smart phone 36 in more detail. The user interface 38, which is a touchscreen display device 38 that shows the current status of the journey planner 10. The user interface 38 is arranged to receive, from the user, their desired destination, which is displayed on screen 38 of the smart phone 36. The user's current mode of transport is listed as "car", but the user is offered a variety of other choices of transport, which they can use if in fact they are not in a car. The user can press the screen 38 at the correct location on the screen 38 in order to change the planner's current mode of transport for the user. When a user overrides a transportation choice, that override gradually diminishes as the user moves away from the physical location where they made that override.

Recalculation of the itinerary 18 can also be based upon other factors, for example the journey planner 10 could make changes based upon a slow user. For example, the user is beginning their journey, and is currently standing outside a building. The turns on their journey planner 10, which determines the quickest route is via an underground train. The user is directed to walk to the underground station. However, the user's walking speed is slower than the journey planner 10 expected and the journey planner 10 determines that, based on this slow walking speed, the quickest route for the user is via the bus. In this case, the user is redirected to a bus stop.

The journey planner 10 can also make live decisions based upon recalculating the itinerary 18 following information received from live feeds. In an example, the user is mid-journey and the journey planner 10 is currently directing the user to a train station in order to catch a specific train. However, a live traffic feed indicates that the desired train is significantly delayed. The journey planner 10 recalculates and finds that catching the bus is faster. The user's directions are updated and the user is notified of the reason and provided with a new itinerary 18. In this way, the journey planner 10 will continue to adapt the itinerary 18 in response to new information, as the user is making the journey towards the destination.

Figure 7:
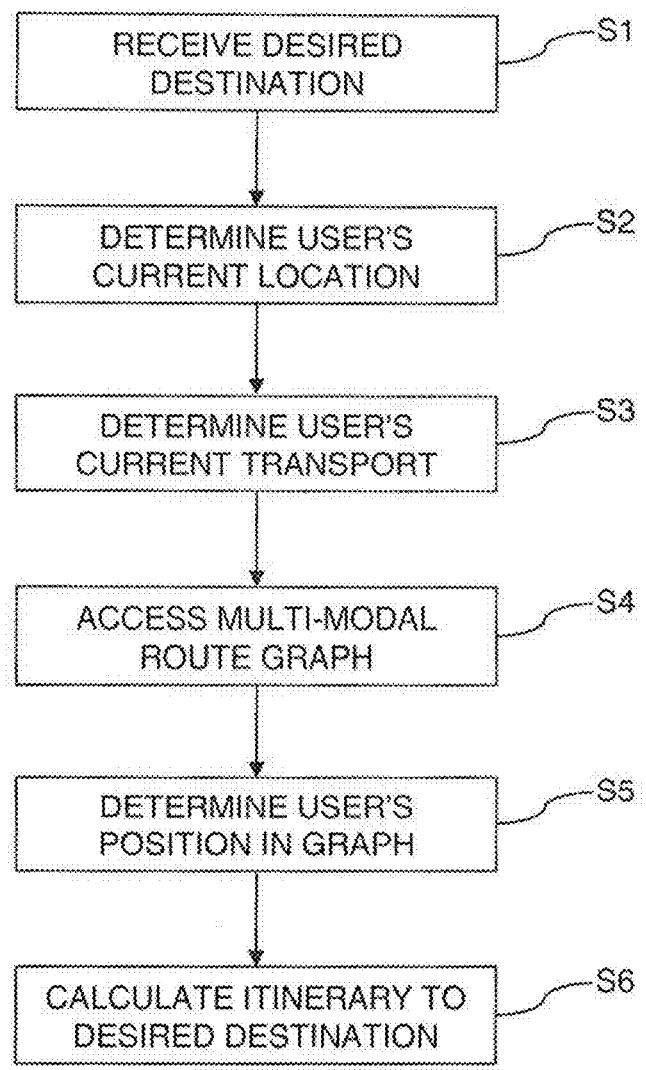
FIG. 7 is a flowchart of a method of generating an itinerary, in accordance with a preferred embodiment of the present invention.

FIG. 7 summarizes the basic process undertaken by the journey planner 10. The process comprises step S1 receiving, from a user, a desired destination, step S2 determining the user's current location, step S3 determining the user's current mode of transport, step S4 accessing a multi-modal route graph, step S5 determining the user's position in the multi-modal route graph according to the user's determined current location and the user's determined current mode of transport, and finally step S6 calculating a multi-modal journey itinerary from the user's position in the multi-modal route graph to the desired destination. In this way the journey planner 10 provides an itinerary 18 that is tailored to the specific mode of transport that the user is currently employing, and can update the user's itinerary 18 during the journey in an appropriate manner.

The calculation of the multi-modal journey itinerary from the user's position in the multi-modal route graph to the desired destination uses an algorithm that will create an itinerary that represents the quickest or shortest route between the two points. Edges on the route graph have times and distances associated with them and the algorithm will traverse the edges within the route graph working out the quickest or shortest route. In general, the journey planner 10 will generate the itinerary based upon the shortest time needed to be taken to get from the current location to the destination. However, the user has the option to use distance as the parameter on which the algorithm is run. The journey planner 10 can also be configured so that the number of changes between different modes of transport is kept to a minimum, so that for example, a specific gain in time has to be achieved for it to be considered appropriate to change between different modes of transport.

As described herein, and according to a first aspect of the present invention, there is provided a method of generating a multi-modal journey itinerary comprising receiving, from a user, a desired destination, determining the user's current location, determining the user's current mode of transport, accessing a multi-modal route graph, determining the user's position in the multi-modal route graph according to the user's determined current location and the user's determined current mode of transport, and calculating a multi-modal journey itinerary from the user's position in the multi-modal route graph to the desired destination.

According to a second aspect the present invention provides a system for generating a multi-modal journey itinerary comprising: a user interface arranged to receive, from a user, a desired destination; means for determining the user's current location; means for determining the user's current mode of transport; means for accessing a multi-modal route graph; means for determining, responsive to the user's determined current location and the user's determined current mode of transport, the user's position in the multi-modal route graph; and means for calculating, responsive to the user's position in the multi-modal route graph, a multi-modal journey itinerary to the desired destination.

Viewed from a further aspect, the present invention provides a computer program product for generating a multi-modal journey itinerary, the computer program product comprising: a computer readable storage medium readable by a processing circuit and storing instructions for execution by the processing circuit for performing a method for performing the steps of the invention.

Viewed from a further aspect, the present invention provides a computer program stored on a computer readable medium and loadable into the internal memory of a digital computer, comprising software code portions, when said program is run on a computer, for performing the steps of the invention.

Owing to the invention, it is possible to provide a multi-modal journey planner that will provide an itinerary for a user that will take into account the user's current mode of transport and will provide an itinerary that is appropriate to the user's current location. For example, a user can be riding a bus, turn on their journey planner, and receive directions that already know that the user is on the specific bus. The solution provided by the journey planner will be effective in a wider range of situations and will not produce an erroneous itinerary, as per prior art situations, which cannot handle situations such as a user being on a bus or train when they make the query to the journey planner.

Many single-mode transportation systems can be represented as graphs, with links between nodes. For example, an obvious and iconic representation is the London underground railway (the "tube") map. The representation of a graph such as this in a computer is similar to the map used by people. However, there are some differences. To a person, "Oxford Circus" is a single station, and therefore on the map it is represented as a single node on the graph as a single physical location. However, in a computer representation of the same system that is used for journey planning, "Oxford Circus" may be represented multiple times, for example, once as the station on the Central line, once as the station on the Victoria line, and once as the station on the Bakerloo line. Another difference is that in a multi-modal route graph, with a graph of nodes and edges, each node represents a state in that system. An edge on the graph represents the fact that you can transition directly from one state to the next. A user inside the system can only ever be at a node. As a concept, the user cannot be on an edge.

Therefore, in the case of a discrete system, such as in a bus system example, the graph would have nodes representing the bus stops as well as nodes representing the buses. If a user is travelling from X to Y via bus B, the journey comprises: starting at node X, getting on bus B, corresponding to 'travelling' along the edge between X and B; and getting off bus B at Y, corresponding to 'travelling' along the edge between B and Y.

In contrast, in the case of a continuous system, such as in a car or walking system, a graph could consist of millions of nodes. In practice it is unlikely that the internal graph representation for these systems stores all of the nodes. Instead the representation stores general information about the roads (for example, that road A starts at position (x location =20, y location =20, height =20) and ends at (40, 40, 40) and then calculates nodes based on the road information.

It is common that a computer system's internal graph representation of a transportation system, particularly a multimodal transportation system, can have multiple internal nodes that each represents the same physical location. This poses a problem to computer systems. Whilst a user may be at a single physical location, this physical location could correspond to a number of different internal graph nodes. It could furthermore be the case that journey-planning instructions differ significantly depending on which internal node is the true representation of the user's physical location. This invention provides a method for distinguishing which internal graph node is the most likely node for a user at a particular physical location. By determining the internal graph node for the user, this then allows the journey planner to give accurate and relevant plans.

In one embodiment, the step of determining the user's current mode of transport comprises calculating a probability score for each of a plurality of modes of transport and selecting the mode of transport with the highest calculated probability score. The journey planner can be pre-programmed with a variety of different modes of transport, such as on foot, in a car, on a bus, etc. Each of these modes of transport can be assigned a probability score based upon a wide range of factors. These factors could be things such as time of day (for example, whether the buses are still running), known prior information about the user (for example, whether the user normally walks to this location) and so on, which will allow a best estimate to be made about the user's current mode of transport.

Preferably, the step of determining the user's current mode of transport comprises accessing information concerning the location of specific transport units and matching the user's determined current location to the accessed location of a transport unit. The journey planner can preferably have access to external information about public transport systems. For example, the planner may have access to information about the current location of specific buses within a bus operator's network. The user's current location could be mapped to the location of a transport unit such as a bus, and this will lead the journey planner to determine that the user is currently on that specific bus.

Advantageously, the step of determining the user's current mode of transport comprises generating a speed profile for the user's movement and comparing the generated speed profile to reference speed profile data for different modes of transport. The journey planner can make a determination of the user's current mode of transport by gathering information about the user's speed over a period of time. The speed information can be used to generate a speed profile, which can then be compared to reference speed profile data. The reference speed profile data could be a stored profile or could be data that is created at that point in time. For example, if a user is moving at a steady speed in a specific direction along a road, but is periodically slowing down at bus stops, then it can be deduced that the user is probably on a bus. Similar profiles can be distinguished for rail travel and walking Ideally, the method further comprises displaying the user's determined current mode of transport, receiving a user input indicating a different mode of transport and setting the user's current mode of transport to the received user input. Once the journey planner has made a decision concerning the user's current mode of transport, which can be displayed to the user through a suitable user interface, the user can be given the opportunity to override the selection made by the journey planner if it is incorrect. This provides a simple way in which the accuracy of the journey planner can be improved.

Preferably, the method further comprises detecting that the user's current mode of transport is at odds with the calculated multi-modal journey itinerary and updating the multi-modal journey itinerary accordingly. The journey planner can continue to operate once the user has embarked on the itinerary that has been generated. Continuously or periodically, the planner can check on the user's current mode of transport and check that it matches the mode of transport that is expected from the itinerary. If there is any disconnection between the actual and expected, then the multi-modal journey itinerary can be updated. For example, a user, while mid-journey, may have disembarked from a bus, in order to pop into a shop. They then may have restarted their journey on foot, and this can be detected by the journey planner and the user can be provided with new instructions relevant to their current mode of transport.

Advantageously, the method can further comprise receiving information relating to a problem with a mode of transport to be used in the calculated multi-modal journey itinerary and updating the multi-modal journey itinerary accordingly. Similarly, the journey planner can continue to make background checks about different modes of transport while the user is navigating the itinerary and if information is received that could impact on the itinerary then a change can be made. For example, a train may be delayed and this may affect the routing in the itinerary. The journey planner can acquire this information and provide a new itinerary for the user.

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, aspects of the present invention may be embodied as a system, method or computer program, or computer program product. Accordingly, aspects of the present invention, including described "software component" aspects (for example the identify, request, calculate, send and migrate components), may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, Radio Frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Java and all Java-based trademarks and logos are trademarks or registered trademarks of Oracle and/or its affiliates.

For the avoidance of doubt, the term "comprising", as used herein throughout the description and claims is not to be construed as meaning "consisting only of".

What is claimed is:

1. A method of generating a multi-modal journey itinerary, the method comprising:
   receiving, by one or more processors, a desired destination from a user;
   determining, by one or more processors, a user's current location for the user; determining, by one or more processors, a user's current mode of transport for the user, wherein said determining the user's current mode of transport comprises:
      calculating a probability score for each of a plurality of modes of transport, and
      selecting a mode of transport with a highest calculated probability score;
   accessing, by one or more processors, a multi-modal route graph;
   in response to said determining the user's current location and in response to determining the user's current mode of transport, determining, by one or more processors, a user's position in the multi-modal route graph;
   in response to said determining the user's position in the multi-modal route graph and in response to determining the user's current mode of transport, calculating, by one or more processors, a multi-modal journey itinerary from the user's position in the multi-modal route graph to the desired destination based on the user's current location and the user's current mode of transport, wherein the multi-modal journey itinerary includes travel directions that are specific for the user's current mode of transport;
   determining, by one or more processors, that the user's current mode of transport is a public vehicle, wherein the public vehicle is a vehicle on a fixed route that is available to public passengers;
   receiving, by one or more processors, positioning sensor readings from a user positioning sensor for the user and a public vehicle positioning sensor for the public vehicle;
   determining, by one or more processors and based on the positioning sensor readings, that a physical distance between the public vehicle and the user is increasing:
   predicting, by one or more processors and based on the physical distance between the public vehicle and the user increasing, that the user has disembarked from the public vehicle and that user's current mode of transport is ambulatory;
   updating, by one or more processors, the travel directions on the multi-modal journey itinerary in real time based on the user currently being off the public vehicle and ambulatory; and displaying, by one or more processors, the updated travel directions on a mobile device used by the user.

2. The method according to claim 1, wherein said determining the user's current mode of transport comprises:
   accessing information concerning a location of specific transport units; and
   matching a user's determined current location to an accessed location of a transport unit.

3. The method according to claim 1, wherein said determining the user's current mode of transport comprises:

generating a speed profile for a user's movement of the user; and comparing a generated speed profile to reference speed profile data for different modes of transport.

4. The method according to claim 1, further comprising:
displaying a user's determined current mode of transport for the user;
receiving a user input indicating that the user's determined current mode of transport is actually a different mode of transport; and
setting the user's current mode of transport to match the received user input.

5. The method according to claim 1, further comprising:
detecting that the user's current mode of transport is unable to satisfy the calculated multi-modal journey itinerary; and
updating the multi-modal journey itinerary with a different mode of transport for the user.

6. The method according to claim 1, further comprising;
receiving information relating to a failure in a mode of transport to be used in the calculated multi-modal journey itinerary; and
updating the multi-modal journey itinerary accordingly.

7. A computer program product for generating a multi-modal journey itinerary; the computer program product comprising a computer readable storage medium having program code embodied therewith, the program code readable and executable by a processor to perform a method comprising:
receiving a desired destination from a user;
determining a user's current location for the user;
determining a user's current mode of transport for the user, wherein said determining the user's current mode of transport comprises:
calculating a probability score for each of a plurality of modes of transport, and
selecting a mode of transport with a highest calculated probability score;
accessing a multi-modal route graph;
in response to said determining the user's current location and in response to determining the user's current mode of transport, determining a user's position in the multi-modal route graph;
in response to said determining the user's position in the multi-modal route graph and in response to determining the user's current mode of transport, calculating a multi-modal journey itinerary from the user's position in the multi-modal route graph to the desired destination based on the user's current location and the user's current mode of transport, wherein the multi-modal journey itinerary includes travel directions that are specific for the user's current mode of transport;
determining that the user's current mode of transport is a public vehicle, wherein the public vehicle is a vehicle on a fixed route that is available to public passengers;
receiving positioning sensor readings from a user positioning sensor for the user and a public vehicle positioning sensor for the public vehicle;
determining, based on the positioning sensor readings, that a physical distance between the public vehicle and the user is increasing;
predicting, based on the physical distance between the public vehicle and the user increasing, that the user has disembarked from the public vehicle and that the user's current mode of transport is ambulatory;
updating the travel directions on the multi-modal journey itinerary in real time based on the user currently being off the public vehicle and ambulatory; and
displaying, by one or more processors, the updated travel directions on a mobile device used by the user.

8. The computer program product of claim 7, wherein said determining the user's current mode of transport comprises:
accessing information concerning a location of specific transport units; and
matching a user's determined current location to an accessed location of a transport unit.

9. The computer program product of claim 7, wherein said determining the user's current mode of transport comprises:
generating a speed profile for a user's movement of the user; and
comparing a generated speed profile to reference speed profile data for different modes of transport.

10. The computer program product of claim 7, wherein the method further comprises:
displaying a user's determined current mode of transport for the user;
receiving a user input indicating a different mode of transport; and
setting the user's current mode of transport to match the received user input.

11. The computer program product of claim 7, wherein the method further comprises:
detecting that the user's current mode of transport is unable to satisfy the calculated multi-modal journey itinerary; and
updating the multi-modal journey itinerary with a different mode of transport for the user.

12. The computer program product of claim 7, wherein the method further comprises:
receiving information relating to a failure in a mode of transport to be used in the calculated multi-modal journey itinerary; and
updating the multi-modal journey itinerary accordingly.

13. A system comprising:
a processor, a computer readable memory, and a computer readable storage medium;
first program instructions to receive a desired destination from a user;
second program instructions to determine a user's current location for the user;
third program instructions to determine a user's current mode of transport for the user, wherein the user's current mode of transport is determined by:
calculating a probability score for each of a plurality of modes of transport, and
selecting a mode of transport with a highest calculated probability score;
fourth program instructions to access a multi-modal route graph;
fifth program instructions to, in response to said determining the user's current location and in response to determining the user's current mode of transport, determine a user's position in the multi-modal route graph;
sixth program instructions to, in response to said determining the user's position in the multi-modal route graph and in response to determining the user's current mode of transport, calculate a multi-modal journey itinerary from the user's position in the multi-modal route graph to the desired destination based on the user's current location and the user's current mode of transport, wherein the multi-modal journey itinerary includes travel directions that are specific for the user's current mode of transport;

seventh program instructions to determine that the user's current mode of transport is a public vehicle, wherein the public vehicle is a vehicle on a fixed route that is available to public passengers;

eighth program instructions to receive positioning sensor readings from a user positioning sensor for the user and a public vehicle positioning sensor for the public vehicle;

ninth program instructions to determine, based on the positioning sensor readings, that a physical distance between the public vehicle and the user is increasing;

tenth program instructions to predict based on the physical distance between the public vehicle and the user increasing, that the user has disembarked from the public vehicle and that user's current mode of transport is ambulatory;

eleventh program instructions to update the travel directions on the multi-modal journey itinerary in real time based on the user currently being off the public vehicle and ambulatory; and twelfth program instructions to display the updated travel directions on a mobile device used by the user; and wherein the first, second, third, fourth, fifth, sixth, seventh, eighth, ninth, tenth, eleventh, and twelfth program instructions are stored on the computer readable storage medium for execution by the processor via the computer readable memory.

14. The system of claim 13, wherein said third program instructions to determine the user's current mode of transport further comprise program instructions to:
  access information concerning a location of specific transport units; and
  match a user's determined current location to an accessed location of a transport unit.

15. The system of claim 13, wherein said third program instructions to determine the user's current mode of transport further comprise program instructions to:
  generate a speed profile for a user's movement of the user; and
  compare a generated speed profile to reference speed profile data for different modes of transport.

16. The system of claim 13, further comprising:
  thirteenth program instructions to display a user's determined current mode of transport for the user;
  fourteenth program instructions to receive a user input indicating a different mode of transport; and
  fifteenth program instructions to set the user's current mode of transport to match the received user input; and wherein the thirteenth, fourteenth, and fifteenth program instructions are stored on the computer readable storage medium for execution by the processor via the computer readable memory.

* * * * *